(No Model.)
S. H. SHORT.
SUPPORT FOR CAR MOTORS.
No. 434,034. Patented Aug. 12, 1890.
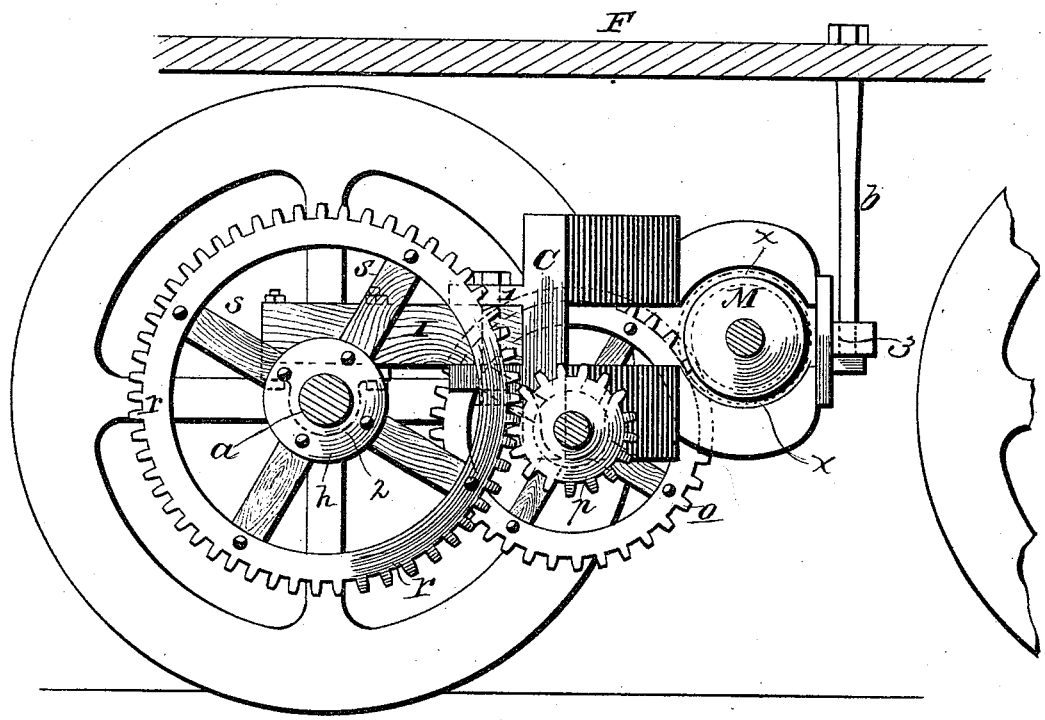
Witnesses
E. J. Nottingham
E. F. Downing
Inventor
Sidney H. Short
By his Attorney
H. A. Seymour

UNITED STATES PATENT OFFICE.

SIDNEY H. SHORT, OF CLEVELAND, OHIO.

SUPPORT FOR CAR-MOTORS.

SPECIFICATION forming part of Letters Patent No. 434,034, dated August 12, 1890.

Application filed April 1, 1890. Serial No. 346,167. (No model.)

*To all whom it may concern:*

Be it known that I, SIDNEY H. SHORT, of Cleveland, in the county of Cuyahoga and State of Ohio, have invented certain new and useful Improvements in Supports for Car-Motors; and I do hereby declare the following to be a full, clear, and exact description of the invention, such as will enable others skilled in the art to which it appertains to make and use the same.

This invention relates to the means for supporting the driving mechanism or motor of an electrically-propelled car or vehicle and for connecting the same with the driving axle or axles of such a car or vehicle.

It has for its main object to reduce to a minimum or to avoid the liability of grounding or short-circuiting the propelling-current through the wheel-base, and to do this independently of the insulation of the wheels or the axles from the ground and while employing approved or advantageous arrangements for supporting the motor and transmitting its power to the driving axle or axles.

According to the said invention the support for the electric motor comprises a beam, block, or frame, which is provided with a bearing for one at least of the car-axles, so as to be supported directly thereby, and which is electrically disconnected from the said car-axle, being to this end made of insulating material, (such as wood, for example,) or otherwise so constructed and arranged that it cannot furnish a path to the electricity, and the driving-gear is also electrically disconnected from the driving axle or axles of the car. When the supporting block, beam, or frame aforesaid is upheld by a bearing-block on one axle only, further support may be gained by a suitable connection with the body of the car, which does not furnish an electrical connection with the wheels and axles from the motor or from the said block, beam, or frame or from the gearing.

The accompanying drawing, which forms part of this specification, is a partial view in side elevation, partly in section, of a car provided with the new or improved propelling machinery.

As shown, the yoke C of the field-magnet of the motor is provided at the back with a socket or fork 1, which receives the end of the supporting-beam I, whereby the said motor is connected with the driving-axle *a* of the car. The end of the support I in the fork or socket 1 is secured there by means of a suitable number of bolts, and the opposite end is bolted to a block 2, which is mounted on the axle *a*, and in which the said axle turns. This support I in the construction shown is a beam of wood which has sufficient insulating capacity to make the said support electrically disconnected from (or discontinuous with) the axle *a*. The opposite end of the field-magnet is provided with an ear-plate 3, of a non-magnetic material, fastened thereto, and is supported by a rod *b*, held at its lower end in the ear-plate 3 and at its upper end fastened to one of the wooden floor-beams F of the car.

The power is transmitted from the armature M of the motor through the train of spur-gears, as shown, consisting of a pinion *x* on the armature-shaft, the wheel *o* engaging the pinion *x*, the pinion *p* on the shaft of the wheel *o*, and the wheel which is fixed on the car-axle *a* and engages the pinion *p*. This wheel is composed of a hub *h* of metal, spokes (or web) *s* of wood, and the rim *r* of metal. The wooden spokes (or web) *s* insulate the rim of the last gear from the hub *h* and the axle *a*, and as the shaft-bearings for the other gears are also insulated from the axle *a* by the non-conducting support I, (there being also no connection electrically through the rod *b*,) the whole train of gears is consequently disconnected from the ground. One or more of the other gears may be also made in whole or in part of non-conducting material, if desired.

Instead of supporting one end of the motor by a rod *b* from the floor of the car, any other suitable support may be employed.

Although the support I between the motor and the car-axle is in the construction shown of non-conducting material, and although such a support is specially included in the invention, yet the latter extends also generally to a motor provided with a support between itself and a car-axle (or axles,) which is electrically disconnected from (or is electrically discontinuous with) said axle (or axles.)

The invention also extends generally to an electric motor insulated from the car-axles, and provided with driving-gear intermediate the armature and one (or both) of said axles and electrically disconnected from (or discontinuous with) said axle (or axles.)

The parts of the car not shown or of the motor itself, or the means for supplying electrical current thereto, may be of any ordinary or suitable description.

The current may be supplied from a double metallic circuit or from a single wire, using the earth or the rails for a return or otherwise—as, for example, from storage-batteries on the car.

In speaking of the motor as being insulated from the axles, reference is had to the field-magnet, armature-shaft, and similar parts, and not to the conductor, which would in a single-line system ordinarily be electrically connected with the ground or a return wire through the axles and wheels of the car.

By the use of a wooden beam or support of non-conducting material between the motor and the journal-bearing on the driving-axle, not only is an effectual guard formed against the establishment of a ground or short circuit by contact therewith of a part of the conducting system of the motor, but the noise is lessened, the vibrations being taken up less actively than by a metal frame. The use of a web or spokes of wood or of non-conducting material in the gears has also this twofold advantage.

I claim as my invention or discovery—

1. In combination with the wheel-base of an electrically-propelled car or vehicle, and the motor for propelling said car or vehicle, the new or improved means for supporting the said motor and gearing its armature to the driving-wheels without establishing an electrical connection therewith, said means comprising a support between the field-magnet and the driving-axle, provided with a journal-bearing for said axle, but being electrically disconnected from the same, and also comprising transmitting-gear electrically disconnected from said axle, substantially as described.

2. In combination with an electrically-propelled vehicle and a motor mounted thereon, but insulated from the wheel-base, driving-gear between the armature of the said motor and the driving-wheels of said vehicle, disconnected electrically from said wheels, substantially as described.

3. In combination with the wheel-base of an electrically-propelled vehicle and the motor for propelling the same, means for supporting the motor and for gearing the armature to the driving-wheels without establishing an electrical connection, said means comprising a wooden beam or support of non-conducting material fixed to the field-magnet of the motor, and provided with a journal-bearing for the driving-axle of said vehicle, and also comprising transmitting-gear electrically discontinuous between the motor and the said axle, substantially as described.

4. In combination with the wheel-base of an electrically-propelled vehicle and the motor mounted thereon, but insulated from the wheel-base, a train of gears, the last of which has wooden spokes, or a web of non-conducting material between the hub on the driving-axle and its rim, substantially as described.

5. The propelling machinery of an electric car or vehicle, comprising a motor, insulating supporting means for said motor, of which means a wooden beam or support of non-conducting material connected with the field-magnet of said motor and provided with a bearing on the driving-axle forms part, and a train of gears mounted in part on the motor-frame and in part on the driving-axle, the gear on said axle being provided with wooden spokes or a web of non-conducting material, substantially as described.

6. In combination with the wheel-base of an electrically-propelled vehicle and the motor for propelling the same, means for supporting the motor, comprising a wooden beam or support of non-conducting material fixed to the field-magnet of the motor and provided with a journal-bearing for the driving-axle of said vehicle, substantially as described.

In testimony whereof I have signed this specification in the presence of two subscribing witnesses.

SIDNEY H. SHORT.

Witnesses:
A. B. CALHOUN,
JOHN C. DOLPH.